United States Patent
Hirvonen

(10) Patent No.: US 7,076,252 B1
(45) Date of Patent: Jul. 11, 2006

(54) MEASURING OF THE COVERAGE AREA OF A BASE TRANSCEIVER STATION

(75) Inventor: Heikki Hirvonen, Tampere (FI)

(73) Assignee: Nokia Corporation, Espoo (FI)

( * ) Notice: Subject to any disclaimer, the term of this patent is extended or adjusted under 35 U.S.C. 154(b) by 327 days.

(21) Appl. No.: 10/148,373

(22) PCT Filed: Nov. 27, 2000

(86) PCT No.: PCT/FI00/01032

§ 371 (c)(1),
(2), (4) Date: May 28, 2002

(87) PCT Pub. No.: WO01/41486

PCT Pub. Date: Jun. 7, 2001

(30) Foreign Application Priority Data

Dec. 3, 1999  (FI) .................................. 19992618

(51) Int. Cl.
*H04Q 7/20* (2006.01)
(52) U.S. Cl. .................... 455/446; 455/424; 455/67.11
(58) Field of Classification Search ................ 455/424, 455/423, 67.11, 67.7, 446
See application file for complete search history.

(56) References Cited

U.S. PATENT DOCUMENTS

| | | | |
|---|---|---|---|
| 5,668,562 A | 9/1997 | Cutrer et al. ................ 343/703 |
| 5,930,707 A * | 7/1999 | Vambaris et al. ............ 455/424 |
| 5,966,657 A * | 10/1999 | Sporre ......................... 455/425 |
| 6,006,089 A * | 12/1999 | Sasaki et al. ................ 455/423 |
| 6,259,912 B1 * | 7/2001 | Si ............................... 455/424 |

FOREIGN PATENT DOCUMENTS

| | | |
|---|---|---|
| EP | 0849966 A2 | 6/1998 |
| GB | 2347826 A | 9/2000 |
| WO | WO-98/37646 A2 | 8/1998 |
| WO | WO-99/56418 A1 | 4/1999 |

* cited by examiner

*Primary Examiner*—Lee Nguyen
(74) *Attorney, Agent, or Firm*—Harrington & Smith, LLP

(57) ABSTRACT

The object of the invention is a method for determining the coverage area of a base transceiver station (BTS) of a cellular network and for finding the optimum place of location of the base transceiver station (BTS). The method comprises connecting a wireless terminal (21) to the base transceiver station (BTS) using a local connection and commanding from the wireless terminal (21) over said local connection the base transceiver station (BTS) to transmit a signal having a specific frequency. The wireless terminal (21) is commanded to receive said frequency. In the wireless terminal (21), the received power of said signal is measured and the numerical value of the received power is displayed on the display (UI) of the wireless terminal (21) for determining the coverage area of the base transceiver station (BTS). The object of the invention is also a wireless terminal (21) that implements the method, as well as a computer program product (51).

17 Claims, 4 Drawing Sheets

MEASURING OF THE COVERAGE AREA OF A BASE TRANSCEIVER STATION

The present invention relates to the measuring of the coverage area of a base transceiver station. Particularly, but not necessarily, the invention relates to the determining and optimising of the place of location and the coverage area of a cellular network's new base transceiver station (BTS) to be commissioned.

Services of a cellular network can be improved by increasing the base transceiver station density. The determining of the place of location of a new base transceiver station is important so that the base transceiver station would serve sufficiently well just that area the serving of which it is designed for. Among other things, the topography of the terrain, the vegetation, buildings, as well as different kinds of structures and objects inside the buildings influence the size of the coverage area significantly. Therefore, for example, when determining the coverage areas of so-called office base stations intended for indoors, such as offices, it is not possible to solely resort to simulations and design tools by which the aim is to forecast the coverage area of a base transceiver station making use of a map or the floor plan of a building. For determining the real coverage area, measurements must also be made in advance in the base transceiver station's planned place of location and in its vicinity.

One much used method to determine the optimum place of location of a base transceiver station is to set separate test transmitter equipment to transmit as a test signal a radio signal from the tentatively planned base transceiver station location and to measure this test signal with a measuring device in the desired service area, i.e. in the coverage area.

However, this type of method has several defects. The radiation pattern of the signal of the test transmitter, i.e. the test signal, does not correspond to the radiation pattern of the actual base transceiver station and neither does the radiation power of the test transmitter accurately correspond to the radiation power of the actual base transceiver station, whereupon the measurer may draw erroneous conclusions as for the coverage area and the transmission power at which the real base transceiver station should finally be set for actual traffic. With most measuring devices, only the power level that occurs at the test signal frequency can be measured. It is therefore impossible to fully make sure that the test signal that arrives in the measuring device is sufficiently free of interference, because the test signal does not necessarily contain coded information, as do signals that normally are transmitted in a cellular network. In addition, the test transmitter equipment is expensive additional equipment which the network planner or base station commissioning engineer has to carry with him, and which has no other use.

Now, a new arrangement has been invented for determining the coverage area of a base transceiver station. According to a first aspect of the invention, there is implemented a method for determining the coverage area of a base transceiver station of a cellular network.

It is characteristic of the method that the method comprises:

connecting a wireless terminal to a base transceiver station using a local connection;

commanding from the wireless terminal connected to the base transceiver station over said local connection the base transceiver station to transmit a signal which has a specific frequency;

commanding said or some other wireless terminal to receive said frequency; measuring the received power of said signal in said or said some other wireless terminal;

displaying the numerical value of said received power on the display of said or said some other wireless terminal for determining the coverage area of the base transceiver station.

According to a second aspect of the invention, there is implemented a wireless terminal A wireless terminal for determining the coverage area of a base transceiver station.

It is characteristic of the wireless terminal that the wireless terminal comprises:

means for connecting the wireless terminal to the base transceiver station using a local connection;

means for commanding the base transceiver station to transmit a signal that has a specific frequency;

means for receiving the signal transmitted by the base transceiver station and for measuring the power of the received signal;

means for displaying the numerical value of the power of said received signal on the display of the wireless terminal for determining the coverage area of the base transceiver station.

According to a third aspect of the invention, there is implemented a computer program product executable in a wireless terminal for determining the coverage area of a base transceiver station.

It is characteristic of the computer program product that it comprises a program code:

for making the wireless terminal connected to the base transceiver station command the base transceiver station to transmit a signal which has a specific frequency;

for making the wireless terminal receive said frequency;

for making the wireless terminal measure the received power of said signal;

for displaying the numerical value of said received power on the display of the wireless terminal for determining the coverage area of the base transceiver station.

In a preferred embodiment of the invention, a base transceiver station is commanded from a mobile station to transmit a radio frequency signal, a test signal on a logical Broadcast Control CHannel (BCCH). The frequency used in said transmitting is set by said mobile station. The signal strength of the signal transmitted by the base transceiver station is measured by the mobile station; the numerical value of the signal strength is displayed on the display of the mobile station; and conclusions are drawn on the basis of it as for the extent of the coverage area of the base transceiver station.

In the following, the invention will be described in detail by referring to the enclosed drawing, in which FIG. 1 is a flow diagram that shows a method according to the invention for determining the coverage area of a base transceiver station;

Figure 1:
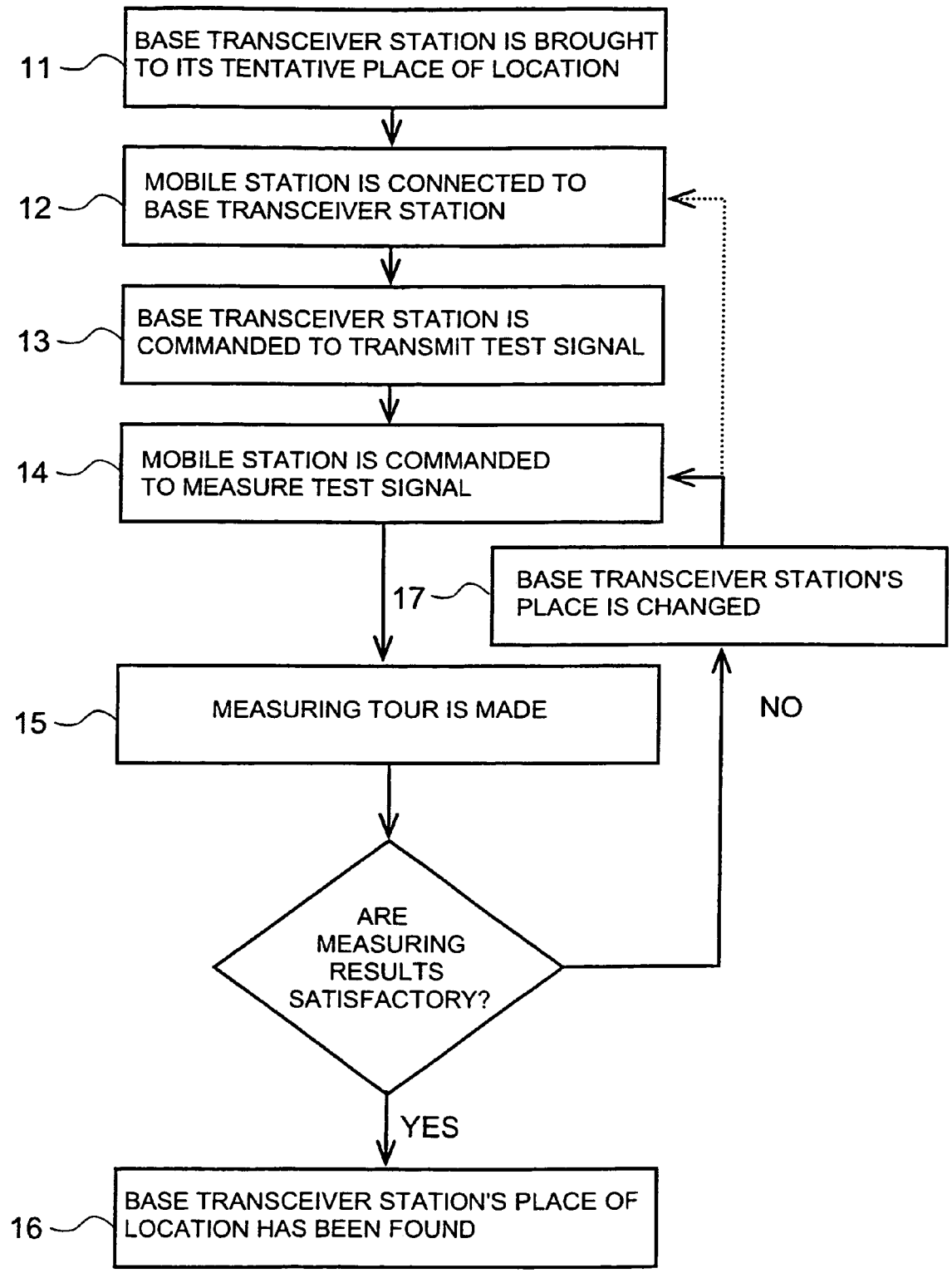

In a first preferred embodiment of the invention, there is determined the optimum place of location of a cellular network's new base transceiver station to be commissioned, when the desired coverage area of the base transceiver station and the tentatively planned place of location are known. The flow diagram shown in FIG. 1 illustrates the most essential method steps of the first preferred embodiment according to the invention. In the first step (block 11), the base transceiver station to be commissioned is brought to its tentatively planned place of location. Next, a mobile station of a cellular network is connected to the base transceiver station (block 12). In block 13, the base transceiver station is commanded from the mobile station to transmit a test signal having a specific frequency. After this, the mobile station can be disconnected from the base transceiver station. In block 14, the mobile station is commanded to lock in the test signal frequency and to measure the power of the received test signal and to simultaneously indicate that it is a question of the signal of just the base transceiver station examined. In block 15, a tour is made in the planned coverage area of the base transceiver station to be commissioned and the measured value of the power of the test signal is monitored on the display of the mobile station. If the measurement results satisfy, the place of location of the base transceiver station has been found (block 16). If the value of the power of the received test signal was not satisfactory everywhere in the base transceiver station's planned coverage area, the place and/or position of the base transceiver station is changed (block 17) the mobile station is re-locked in the test signal frequency and it is re-measured (it is moved to block 14). If in between the measurements, there is a desire also to change the parameters of the test signal, such as the frequency or transmission power, it is returned to block 12 (dashed line).

Preferably, the equipment used in the method only comprises a mobile station of a cellular network, as well as the base transceiver station for which the optimum place of location is being searched. No separate test transmitter equipment and measuring equipment are required. Only one person is required to carry out the method, who hereinafter will be called a base station commissioning engineer.

Said base transceiver station of a cellular network can be, for example, a so-called office base station (Nokia InSite base station) of a GSM (Global System for Mobile Communications) network, which is designed to be positioned inside a building.

Said mobile station can be, for example, a Nokia 9110 Communicator mobile station or some other mobile station.

The base transceiver station for which the optimum place of location is being searched comprises a local interface through which it can be given commands locally for controlling the base transceiver station. When the base transceiver station has been brought to its tentative place of location, the power is switched on and the mobile station is connected to its local interface. This can be done with a cable by connecting one end of the cable to the mobile station's data connector (serial port) and the other end to the base transceiver station, to the connector of its local interface.

Alternatively, the mobile station can be connected to the local interface of the base transceiver station through an infrared connection. This presupposes that the base transceiver station and the mobile station both comprise an IR (Infra Red) transceiver. Alternatively, an LPRF (Low Power Radio Frequency) connection, a WLAN (Wireless Local Area Network) connection or some other short-range wireless connection can also be used.

Now, the mobile station is set in a test transmission function state by starting a menu controlled computer program (application) installed in the mobile station for this purpose and by selecting from the main window of its user interface the Test-BCCH function on. By using the Test-BCCH function, it is possible according to the invention, among other things:

- to give from the mobile station the base transceiver station a command for starting a test transmission on the BCCH channel;
- to measure the test signal transmitted by the base transceiver station by the mobile station and to bring the measurement results onto the display of the mobile station;
- to give from the mobile station the base transceiver station a command for stopping the test transmission.

Figure 2:
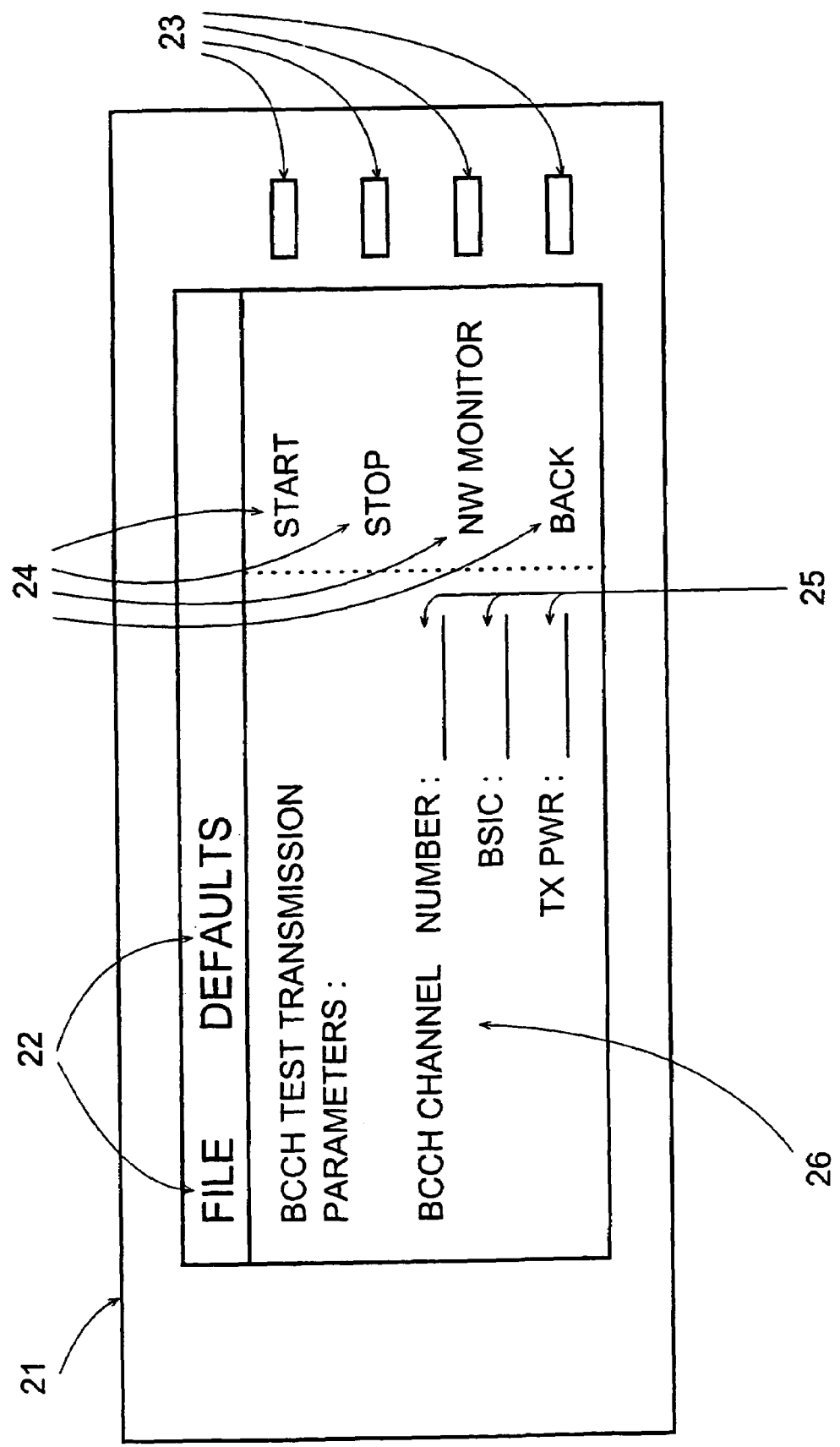
FIG. 2 shows one detail in a mobile station according to the invention.

In the following, said application will be called a test-BCCH application. FIG. 2 illustrates an exemplary view on a display 26 of a mobile station 21 according to the invention, as well as function keys 23 in the vicinity of the display, when the Test-BCCH function is selected as active. Typically, on the upper edge of the display 26, there are specific menus 22. On the right-hand edge of the display 26, there can be found explanations 24 of the function keys 23, located next to the display 26. The Start function key 23 is used for activating the command to be transmitted from the mobile station 21 to the base transceiver station for starting the test transmission. By pressing the NW Monitor key 23, the mobile station 21 can be activated to measure the test signal in question and the measurement results can be brought onto the mobile station's display 26. With the Back function key 23, the measuring of the test signal can be stopped. The command for stopping the test transmission can be activated by pressing the Stop key 23. In fields 25, the base station commissioning engineer can input specific set values of the BCCH test transmission parameters.

Figure 3:
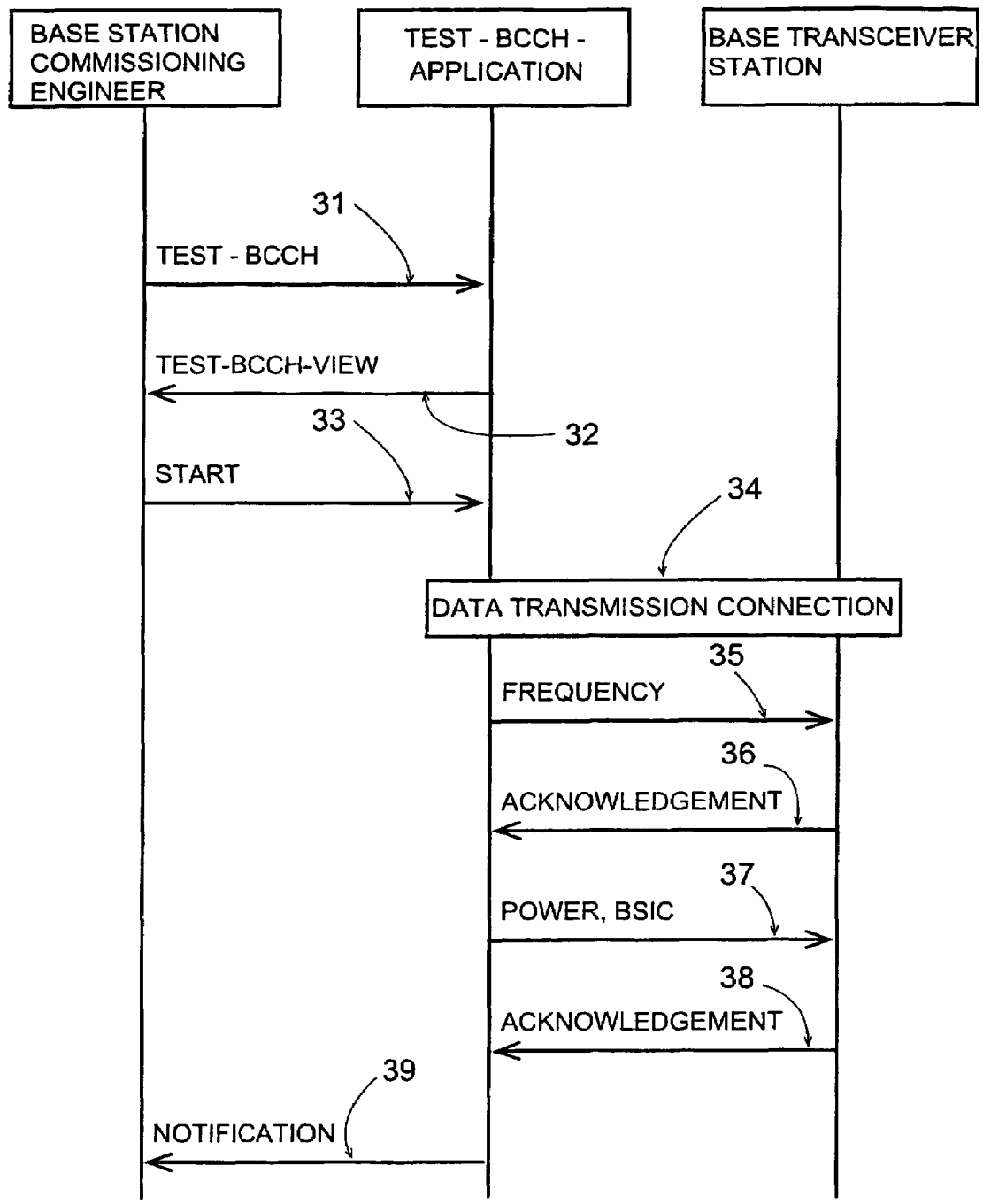
FIG. 3 is a signal diagram that shows the flow of signals in a method according to the invention.

FIG. 3 shows a signal diagram that illustrates the flow of signals in a part of a method according to the invention between a user of the mobile station 21 (base station commissioning engineer), the computer application (test-BCCH application) and the base transceiver station. When the Test-BCCH function is selected on 31 in the mobile station 21, a view 32 shown in FIG. 2 is displayed on the display 26. The base station commissioning engineer inputs with the help of the keyboard of the mobile station 21 the set values of the BCCH test transmission parameters onto the display 26 of the mobile station. The used transmission frequency of the test transmission is always given as a set value and optionally, e.g. a Base Station Identity Code (BSIC), as well as the information on the transmission power are given. The transmission frequency of the test transmission is preferably given as the number of the frequency channel. If the base station commissioning engineer does not set values on the BSIC or the transmission power, default values known to the test-BCCH application are used for these parameters. For example, for the transmission power, the default value is the maximum power.

For the transmission frequency to be used in the test transmission, the base station commissioning engineer may select some free frequency at which there is no traffic in the area of the base transceiver station to be installed. The base station commissioning engineer may determine the free frequency, for example, by studying documents that indicate the transmission frequencies of the base transceiver stations located in the surroundings of the area and by selecting some free frequency as the transmission frequency. Alternatively, it is possible to use any scanner suitable for the purpose, such as the same mobile station 21 especially equipped with a scanning property to scan the traffic frequencies in the area and to determine some free frequency from among the scanning results. It is almost the same which free frequency is used on a specific frequency band, because the changing of a frequency within a given band does not influence the coverage area to any significant extent.

On pressing 33 the Start key 23, the set values given by the user are transferred to the test-BCCH application and a data transmission connection 34 is established through the local interface between the mobile station 21 and the base transceiver station. Typically, L2 protocol (L=Layer) suitable for the purpose is used for establishing the connection.

Next, the mobile station 21 sends the base transceiver station through its local interface a signal 35 that denotes the transmission frequency used in the test transmission. Typically, the base transceiver station sends the mobile station 21 after this an acknowledgement 36. Next, the mobile station 21 sends the base transceiver station through its local interface a signal 37 that sets the base station identity code BSIC that the base transceiver station transmits on the BCCH channel, and the transmission power used. After also acknowledging 38 this signal 37, the base transceiver station starts transmitting a test signal on the BCCH channel using the above-mentioned frequency selected by the base station commissioning engineer as the transmission frequency of the BCCH channel. The base station commissioning engineer is informed 39 of the starting of the transmission on the display 26 of the mobile station (and typically, also with the base transceiver station's indicator lights). Depending on the implementation, it is also possible to indicate the transmission frequency, power and BSIC code from the mobile station 21 to the base transceiver station by a single signal.

Now, the view shown in FIG. 2 returns again onto the display 26 of the mobile station 21. The base station commissioning engineer can now disconnect the mobile station from the local interface of the base transceiver station and give the test-BCCH application more commands.

Alternatively, the test signal transmitted by the base transceiver station can also be some other signal normally used in the cellular network system in question. For example, in a GSM network, the test signal preferably is, however, a BCCH signal according to GSM specifications, which every GSM phone can measure and measures as part of its normal basic functions. The signal includes several parameters. Other parameters, except a so-called "cell barred" bit that denotes that the cell is barred, may have any standard value set by the base transceiver station, because they are of no interest as regards measuring. The "Cell barred" bit is on, i.e. it has a value that denotes that the cell is barred so that telephones of a cellular network in normal GSM telephony will not lock in a cell that is in a test state. No separate software needs to be installed in the base transceiver station for its local use and the sending of a test transmission, but the factory-installed standard software is sufficient.

Figure 4:
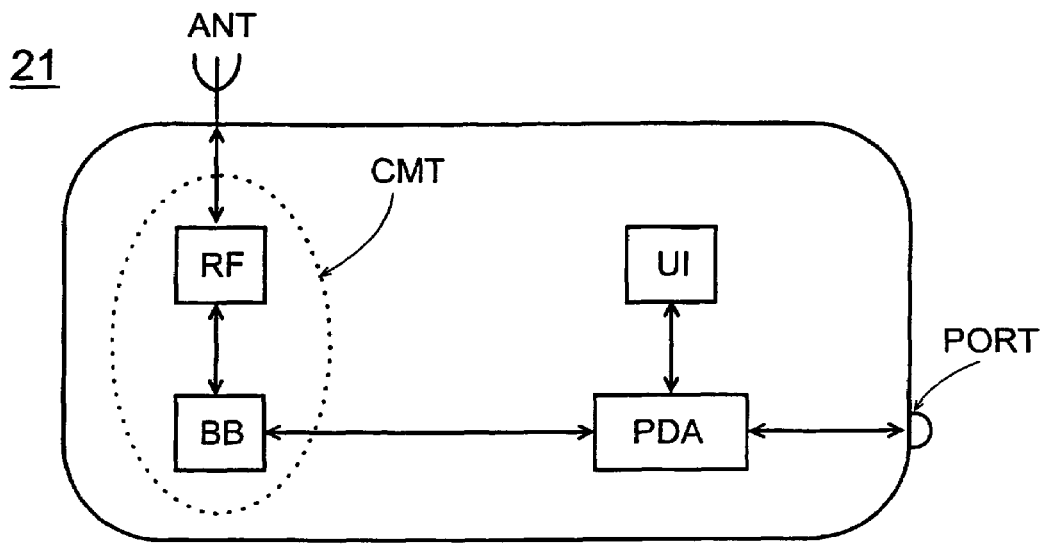
FIG. 4 shows a mobile station according to the invention.

FIG. 4 shows a rough functional block diagram of a mobile station 21 suitable for implementing a first preferred embodiment of the invention. The mobile station 21 preferably comprises a telephone part CMT (Cellular Mobile Telephony), an application computer PDA and a user interface UI. The telephone part comprises a radio part RF (Radio Frequency) and a baseband part BB. The radio part RF can transmit and receive radio frequency signals by its antenna ANT. The user interface UI provides the user with a display 26 and a keyboard (comprising the function keys 23 mentioned above) for using the mobile station 21. Furthermore, the mobile station 21 comprises an external traffic port PORT (serial port, IR port) through which the mobile station 21 can be connected to the local interface of a base transceiver station. Said test-BCCH application relating to the invention is located in a memory of the application computer PDA.

Figure 5:
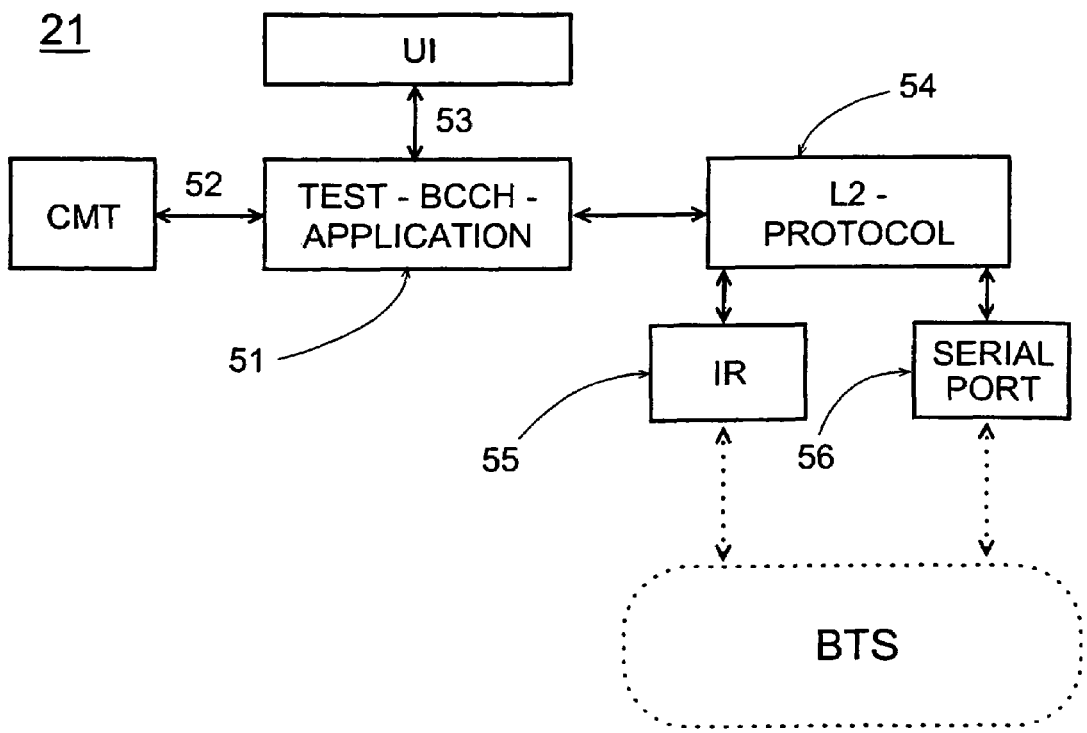
FIG. 5 shows a logical block diagram of the mobile station shown in FIG. 4.

FIG. 5 shows a logical block diagram of the mobile station 21 of FIG. 4. Typically, the telephone part CMT has its own software and the application computer PDA has its own. The software to be run in the telephone part CMT and a test-BCCH application 51 according to the invention, which is in the application computer PDA, may converse over a signal interface 52. This being the case, it is possible to inquire from the program process of the test-BCCH application 51 executed in the application computer PDA, of the program process executed in the telephone part CMT about the values of specific parameters known to the software of the telephone part CMT. In practice, the inquiry is carried out for a specific bus of the telephone part CMT by which functions of the telephone part CMT can be controlled. Said command is called here a PCI function and said bus is called a D-BUS. These are utilised in the invention. Here, it must be noted that the names of the bus (D-BUS) mentioned above and of the commands (PCI function) may vary depending on the used implementation of the mobile station 21.

FIG. 5 also shows a user interface UI by which the test-BCCH application 51 communicates through an interface 53. In the direction of the base transceiver station BTS, the test-BCCH application 51 communicates over L2 protocol 54 (e.g. LapD, IP), for example, with the help of the signals presented above in connection with FIG. 3, for example, through an IR link 55 or a cable connected in a serial mode to a serial port 56 of the mobile station, as was presented above.

When the base transceiver station BTS has been made to transmit the test signal on the BCCH channel, the base station commissioning engineer activates the mobile station 21 to measure the test signal transmitted by the base transceiver station BTS. First, the base station commissioning engineer presses the NM Monitor function key 23, as a result of which a view appears on the display 26 of the mobile station, where the frequency to be measured is asked. The base station commissioning engineer preferably inputs as the number of the frequency channel for the test-BCCH application 51 the number of the frequency channel on which frequency channel the base transceiver station BTS is commanded to transmit the test signal. By default, the test-BCCH application 51 uses as the frequency to be measured the frequency used in the transmission command 35 given above. The base station commissioning engineer commands from the test-BCCH application 51 the telephone part CMT to measure the test transmission frequency by pressing the Start function key 23.

In practice, after obtaining the information on the frequency channel to be measured, the test-BCCH application 51 commands the telephone part CMT of the mobile station 21 to lock in the test transmission frequency. This is effected in a specific process of the computer program (test-BCCH application 51) executed in the application computer by giving a command (e.g. with the PCI function) to a bus (e.g. D-BUS) of the telephone part mentioned above by which the telephone part CMT can be controlled. In the command, the telephone part CMT is commanded to lock in the test transmission frequency although the cell barred bit of the test signal is on. The telephone part CMT, the logic of which leaves the value of the cell barred bit uninterpreted, now locks in the frequency of the test signal and starts to measure the strength of the test signal it receives (received power).

The mobile station 21 can measure the strength of the signal it receives and indicate the BSIC included in the signal. Why, the mobile station 21 also measures the strength of a signal received by it and interprets BSICs in normal GSM telephony. The measured signal strength is utilised in normal GSM telephony, for example, in the adjusting of the transmission power of a base transceiver station BTS. Typically, in order to obtain the numerical value of the signal strength, an analog RSSI (Received Signal Strength Indication) signal is supplied from the radio part RF of the telephone part CMT to the baseband part BB of the telephone part CMT, wherein it is A/D converted. After this, the software of the mobile station 21 has the use of the numerical value of the power of the received signal.

According to the invention, said numerical value (and the BSIC of the base transceiver station transmitting the test signal) is supplied from the telephone part CMT into the application computer PDA. This is effected so that the test-BCCH application 51 of the application computer inquires about the power value of the received signal (and that of the BSIC) of the software of the telephone part CMT over the interface 52. According to the invention, the numerical value (and the BSIC) is also supplied from the test-BCCH application 51 to the user interface UI of the mobile station 21 through the interface 53 and it is displayed in dBm units on the display 26 of the mobile station. However, the displaying of the BSIC on the mobile station's display 26 is not necessary as regards the operation of the method.

The test-BCCH application 51 inquires about the power value of the software of the telephone part CMT, at specific moments of time in the course of time. This can be done, for example, at intervals of one second, whereupon the measured power value can correspondingly be updated on the display 26 of the mobile station 21 at intervals of one second. Preferably, the power values are also stored in a file in a memory of the mobile station 21 (in the application computer PDA), whereupon when the measuring is stopped in due course, the entire measurement history can be brought graphically onto the mobile station's display 26.

When the mobile station 21 has started by the base station commissioning engineer's command to measure the test signal transmitted by the base transceiver station BTS, the base station commissioning engineer now makes a measuring tour, i.e. moves with the mobile station 21 in the desired coverage area of the base transceiver station BTS and in its vicinity and monitors on the mobile station's display the numerical value of the power of the received signal in a plurality of measuring points during the tour in the desired coverage area of the base transceiver station BTS and in its vicinity. All measuring points, where the received power is higher than a specific power limit, e.g. −85 dBm can be considered to belong to the coverage area.

Typically, one measuring tour takes a few minutes. When the base station commissioning engineer ends the measuring tour, he presses the Back function key 23 of the mobile station 21. This being the case, the test-BCCH application 51 gives the telephone part CMT of the mobile station 21 a stop command after which the telephone part CMT transfers to normal GSM operation and may lock in a GSM network.

The test-BCCH application 51 may comprise an additional function that brings onto the display 26 of the mobile station 21 a graphic summary of the measured power values if the measured power values were stored in a memory of the application computer PDA during the measuring tour. Thus, the base station commissioning engineer may, if he so desires, obtain onto the display 26 the information on the highest and lowest measured power values, as well as a diagram specifying how often the measured power value was of a given level.

For determining the optimum place of location of the base transceiver station BTS, the place and/or position of the base transceiver station BTS that transmits the test signal is changed after the measuring tour and the test signal is re-measured. The transmission frequency and power can be changed in between the measuring tours as necessary. In this case, the mobile station 21 must be re-connected to the local interface of the base transceiver station BTS and the base transceiver station BTS must be commanded to transmit with new values of the transmission frequency and power.

When the optimum place of location, i.e. the place transmitted from which the test signal best covered the whole desired coverage area is found, the final transmission power required in the cell after the commissioning of the base transceiver station BTS can be tentatively determined by now finding the lowest possible power by which the whole coverage area can be covered.

When wanting the base transceiver station BTS to stop the transmission of the test signal on the BCCH channel, the base station commissioning engineer connects the mobile station 21 to the local interface of the base transceiver station BTS and commands from the test-BCCH application 51 the base transceiver station BTS to stop transmitting the test signal. This is effected by pressing the Stop function key 23 when the mobile station 21 is in a test-BCCH state, as was noted in connection with the legend of FIG. 2. In this case, the mobile station 21 sends the base transceiver station BTS through its local interface a signal commanding the base transceiver station BTS to stop transmitting the test signal.

In a second embodiment according to the invention, the base station commissioning engineer is shown on the display 26 of the mobile station 21 in addition to the power value a bit error ratio BER, whereupon the quality of the received test signal and possible interference in the coverage area can also be evaluated. In the mobile station 21, the value of the BER is determined as a so-called Pseudo BER, for example, so that the output of the channel decoder comprised by the baseband part BB is re-channel coded and compared to the input of the channel decoder. This being the case, an estimate is obtained for the BER. The value of the BER (as well as the power value of the received signal) is known to the software of the telephone part CMT and, therefore, it too can be made known to the test-BCCH application 51 executed in the application computer PDA by inquiring about it from the test-BCCH application 51 in a manner presented above in connection with the inquiring about the power value of the received signal.

Due to the measuring arrangement, according to a method according to the invention the base transceiver station BTS does not have to be connected to a cellular network, but it is set in a test transmission state locally. For example, in the case of a GSM network, no Abis transmission link in between the base transceiver station BTS and a base station controller is thus required.

With the help of the present invention, the optimum place of location can be searched for a new base transceiver station BTS without separate expensive test transmitter and measuring equipment. The request for transmitting a test signal is given by the mobile station 21, by which the test signal is also measured and which also can store the measurement results.

Naturally, the mobile station 21 by which the request for transmitting the test signal is given, can be a different mobile station 21 to the mobile station 21 by which the test signal is measured. Alternatively, the transmitting of the test signal from the base transceiver station BTS can also be stopped by switching off the power of the base transceiver station BTS.

Because the real base transceiver station BTS for which a place of location is being searched is used for transmitting the test signal, the radiation pattern of the test signal transmitted is similar to the pattern produced after the commissioning of the cell. Therefore, the measurement results measured in the test situation correspond accurately to the actual situation in the desired coverage area, whereupon the optimum place of location of the base transceiver station BTS is easy to determine. Because the base transceiver station BTS does not have to be connected to a GSM network in the measuring phase, but it is set in a test transmission state locally, the base transceiver station BTS is easy to move for finding the right place without a need to transfer transmission network connections.

The final transmission power required in the cell after the commissioning can also be determined reliably according to the invention, because the transmitter and antenna of the real base transceiver station BTS are used in the measuring phase. Thus, any un-idealities related to the system, such as antenna gain and cable attenuation, are automatically taken into consideration.

The invention is suitable for use both in TDMA (Time Division Multiple Access) and CDMA (Code Division Multiple Access) systems. Said test-BCCH application can be programmed, for example, by some object oriented programming language, such as C++ or some other programming language suitable for the purpose.

Depending on the implementation, the telephone part CMT of a mobile station that implements the invention and the application computer PDA can also be integrated into each other, whereupon they do not necessarily have to have separate software, but they can also use common software.

This paper presents the implementation and embodiments of the present invention, with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A method for determining the coverage area of a base transceiver station of a cellular network, characterised in that the method comprises:
   connecting a wireless terminal to the base transceiver station using a local connection;
   commanding from the wireless terminal connected to the base transceiver station over said local connection the base transceiver station to transmit a signal that has a specific frequency;
   commanding said or some other wireless terminal to receive said frequency;
   measuring the received power of said signal in said or said some other wireless terminal;
   displaying the numerical value of said received power on the display of said or said some other wireless terminal for determining the coverage area of the base transceiver stations,
   wherein said local connection comprises one of the following: a cable having one end connected to a data connector of the wireless terminal and another end connected to the base transceiver station, a serial cable, an IR (Infra Red) connection, a LPRF (Low Power Radio Frequency) connection or a WLAN (Wireless Local Area Network) connection.

2. A method according to claim 1, characterised in that the frequency at which the base transceiver station is commanded to transmit said signal is set by said terminal.

3. A method according to claim 1, characterised in that said signal transmitted by the base transceiver station is a BCCH (Broadcast Control CHannel) signal that comprises the identity code of said base transceiver station (BSIC, i.e. Base Station Identity Code) and that in addition to the numerical value of the received power of said signal said base station identity code (BSIC) is displayed on the display of the wireless terminal.

4. A method according to claim 1, characterised in that the method further comprises measuring in the wireless terminal the bit error ratio (BER) of the received signal and that the value of said bit error ratio is also displayed on the display of the wireless terminal.

5. A method according to claim 1, characterised in that the method comprises determining the optimum place of location of the base transceiver station, when the desired coverage area of the base transceiver station is known:
   by setting the base transceiver station at a plurality of different places of location, wherein transmission of said signal occurs at least at the different places of location; and
   by comparing the power of the signal received by the wireless terminal, transmitted from the different places of location, in the desired coverage area of the base transceiver station.

6. A method according to claim 5, characterised in that after the optimum place of location of the base transceiver station is found, the base transceiver station is commanded from the wireless terminal to stop transmitting said signal.

7. A method according to claim 1, characterised in that the method comprises:
   storing said numerical value of the power of the received signal at specific moments of time in the wireless terminal;
   displaying said stored numerical values graphically on the display of the wireless terminal.

8. A method according to claim 1, characterised in that the local connection is established through a local interface of the base transceiver station.

9. A wireless terminal (21) for determining the coverage area of a base transceiver station (BTS), characterised in that the wireless terminal (21) comprises:
   means (51, 54–56, PORT) for connecting the wireless terminal (21) to the base transceiver station (BTS) using a local connection;
   means (51, 53–56, UI, PORT) for commanding the base transceiver station (BTS) to transmit a signal that has a specific frequency;
   means (ANT, CMT) for receiving the signal transmitted by the base transceiver station and for measuring the power of the received signal;

means (CMT, 51–53, UI) for displaying the numerical value of the power of the received signal on a display (26) of the wireless terminal (21) for determining the coverage area of the base transceiver station (BTS).

10. A method for determining the coverage area of a base transceiver station of a cellular network, characterised in that the method comprises:
   connecting a wireless terminal to the base transceiver station using a local connection, wherein said local connection is implemented by one of the following: serial cable, IR (Infra Red) connection, LPRF (Low Power Radio Frequency) connection or WLAN (Wireless Local Area Network) connection;
   commanding from the wireless terminal connected to the base transceiver station over said local connection the base transceiver station to transmit a signal that has a specific frequency;
   commanding said or some other wireless terminal to receive said frequency;
   measuring the received power of said signal in said or said some other wireless terminal;
   displaying the numerical value of said received power on the display of said or said some other wireless terminal for determining the coverage area of the base transceiver station.

11. A method for determining the coverage area of a base transceiver station of a cellular network, characterised in that the method comprises:
   connecting a wireless terminal to the base transceiver station using a local connection;
   commanding from the wireless terminal connected to the base transceiver station over said local connection the base transceiver station to transmit a signal that has a specific frequency;
   commanding said or some other wireless terminal to receive said frequency;
   measuring the received power of said signal in said or said some other wireless terminal; and
   displaying the numerical value of said received power on the display of said or said some other wireless terminal for determining the coverage area of the base transceiver station; and
   determining the optimum place of location of the base transceiver station, when the desired coverage area of the base transceiver station is known:
      by setting the base transceiver station at a plurality of different places of location, wherein transmission of said signal occurs at least at the different places of location;
      by comparing the power of the signal received by the wireless terminal, transmitted from the different places of location, in the desired coverage area of the base transceiver station; and
      after the optimum place of location of the base transceiver station is found, the base transceiver station is commanded from the wireless terminal to stop transmitting said signal.

12. A method according to claim 11, characterised in that the frequency at which the base transceiver station is commanded to transmit said signal is set by said terminal.

13. A method according to claim 11, characterised in that said signal transmitted by the base transceiver station is a BCCH (Broadcast Control CHannel) signal that comprises the identity code of said base transceiver station (BSIC, i.e. Base Station Identity Code) and that in addition to the numerical value of the received power of said signal said base station identity code (BSIC) is displayed on the display of the wireless terminal.

14. A method according to claim 11, characterised in that the method further comprises measuring in the wireless terminal the bit error ratio (BER) of the received signal and that the value of said bit error ratio is also displayed on the display of the wireless terminal.

15. A method according to claim 11, characterised in that said local connection comprises one of the following: a cable having one end connected to a data connector of the wireless terminal and another end connected to the base transceiver station, a serial cable, an IR (Infra Red) connection, a LPRF (Low Power Radio Frequency) connection or a WLAN (Wireless Local Area Network) connection.

16. A method according to claim 11, characterised in that the method comprises:
   storing said numerical value of the power of the received signal at specific moments of time in the wireless terminal;
   displaying said stored numerical values graphically on the display of the wireless terminal.

17. A method according to claim 11, characterised in that the local connection is established through a local interface of the base transceiver station.

* * * * *